United States Patent [19]

Manoogian et al.

[11] 3,964,514

[45] June 22, 1976

[54] PUSH-PULL SINGLE HANDLE WATER FAUCET VALVE

[75] Inventors: Alex Manoogian, Groose Pointe Farms; Eric V. Pullen, Southfield, both of Mich.

[73] Assignee: Masco Corporation of Indiana, Greensburgh, Ind.

[22] Filed: July 1, 1974

[21] Appl. No.: 484,989

[52] U.S. Cl............................ 137/625.17; 251/285
[51] Int. Cl.²......................................... F16K 11/00
[58] Field of Search................. 137/625.12, 625.13, 137/625.17, 625.4, 630.16, 630.17, 636.4; 251/284, 285, 288

[56] References Cited
UNITED STATES PATENTS

| | | | |
|---|---|---|---|
| 3,170,488 | 2/1965 | Manoogian | 137/625.17 |
| 3,559,684 | 2/1971 | Rudewick | 137/625.17 |
| 3,674,048 | 7/1972 | Manoogian et al. | 137/625.41 X |

*Primary Examiner*—Martin P. Schwadron
*Assistant Examiner*—Richard Gerard
*Attorney, Agent, or Firm*—E. Dennis O'Connor

[57] ABSTRACT

A single handle hot and cold water mixing and flow control faucet valve of the type wherein the operating handle is reciprocally movable along its own axis to vary flow volume passing through the valve and rotatable about its own axis to vary the proportions of hot and cold water passing through the valve. Stop means are provided on the valve body and operating handle to prevent axial movement of the handle to and from the off position unless the handle is in a cold water only rotational position and to prevent rotation of the handle in one direction from this position. Additional adjustable stop means may be provided to limit the extent of possible rotational movement from a cold water only position towards a hot water only position.

6 Claims, 4 Drawing Figures

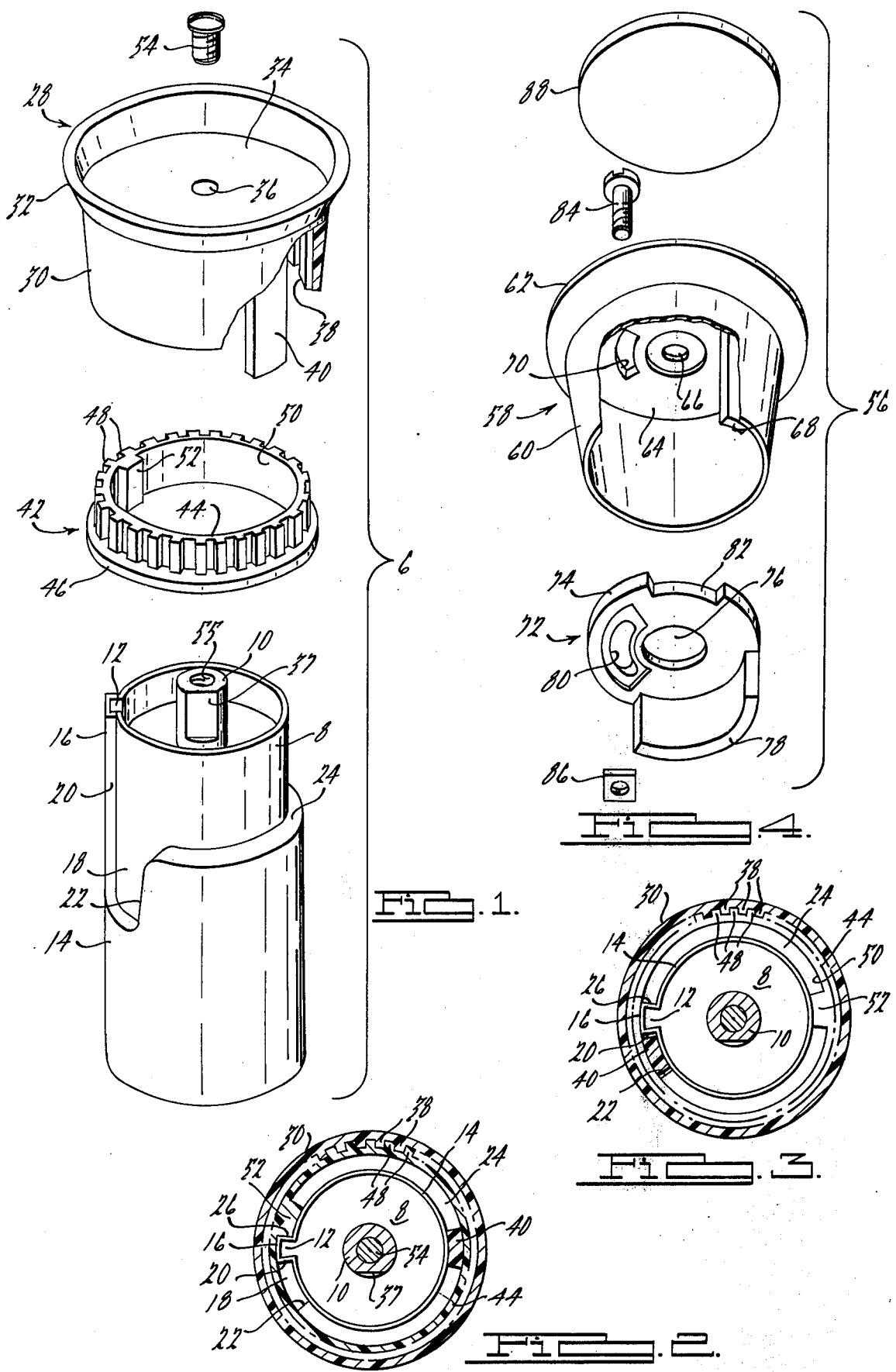

PUSH-PULL SINGLE HANDLE WATER FAUCET VALVE

BACKGROUND OF THE INVENTION

Single handle faucets for the control of both hot and cold water flow have gained wide acceptance in the construction industry as well as with the consuming public. The advantages of such faucets are many and include the capability of mixing or blending hot and cold water from separate sources, selectively allowing flow of only hot or cold water and control the flow volume by manipulation of a single operating handle. A well-known type of single handle faucet valve is the push-pull type that provides for a reciprocal handle movement along the axis of the handle to control water flow volume and rotation of the handle about its own axis to vary the proportions of hot and cold water passing through the valve. Examples of this type of single handle faucet valve are disclosed by U.S. Pat. Nos. 3,170,488, issued Feb. 23, 1965, and 3,204,656, issued Sept. 7, 1965.

Recently, certain parties concerned with plumbing aspects of the construction industry have concluded that it is desirable, and in some cases necessary, that hot and cold water single handle faucet valves be incapable of manipulation so that the operating handle moves from the off position directly to a position whereat water at a high temperature passes through the valve. Additionally, it has been urged that faucet valves of this type be adjustable so that the hot water portion of total flow volume selectively can be limited in response to various hot water temperatures that may be provided by different hot water sources. In fact, in at least one instance, such requirements for single handle faucet valves have been included in governmental building code requirements.

It is, therefore, an object of this invention to provide a single handle faucet valve of the push-pull type such as those disclosed in the above-mentioned patents that is incapable of being manipulated directly from an off condition to a condition wherein only hot water or water at an elevated temperature is supplied through the valve. In particular, the operating handle of the push-pull faucet valve of this invention can be moved from the off position to a hot water only position only by first passing through a relatively high volume cold water only position. Another object of this invention is the provision of a push-pull single handle faucet valve of the type previously described that easily is adjustable to limit the possible percentage of water from the hot water source in the total water flow to compensate the variances in the temperature of hot water supplied from different hot water sources. A still further object of this invention is the provision of a faucet valve having the above-mentioned features provided by structure that is relatively simple in design, reliable in performance and easily may be manufactured, assembled and serviced.

SUMMARY OF THE INVENTION

A single handle hot and cold water mixing and flow control faucet valve constructed in accordance with this invention is the type having a main body enclosing relatively movable valve means selectively operable to connect or isolate hot and cold water sources with water outlet means. An elongated, manually movable operating stem is operably connected to said valve means for movement therewith and projects from the main body of the valve. This stem is reciprocally movable along its longitudinal axis between a retracted off position and an extended full volume position to vary the flow volume through the valve. The stem is rotatable about its own axis between a cold water only position and a hot water only position to vary the proportion of hot and cold water passing through the valve. Handle means are carried by the stem for movement therewith. Cooperating first rotational stop means are carried by the main body and the handle and prevent rotation of the stem when the stem is in the retracted off axial position and the cold water only rotational position. These first rotational stop means permit stem rotation in only one rotational direction toward the hot water only rotational position when the stem is in partially or fully extended axial positions and the cold water only rotational position. Cooperating second rotational stop means carried by the main body and the handle limit the rotation of the stem in the one rotational direction. Cooperating axial stop means carried by the main body and the handle prevent axial movement of the stem from a partially extended position to the retracted off position unless the stem is in the cold water only rotational position. Additional rotational stop means also may be provided which, through cooperation with part of the first rotational stop means formed on the valve body, limit the extent of possible rotational movement of the stem in the one rotational direction.

DESCRIPTION OF THE DRAWING

FIG. 1 is an exploded view, with parts broken away and parts in section for purposes of clarity, of the push-pull single handle water faucet valve of this invention;

FIG. 2 is a section view along a plane normal to the longitudinal axis of the valve of FIG. 1 and extending through the valve handle, with the valve in hot water only condition;

FIG. 3 is a view similar to FIG. 2 but showing the valve in the off condition; and FIG. 4 is an exploded view of a second embodiment of valve handle according to this invention.

DETAILED DESCRIPTION OF THE INVENTION

Referring now in detail to the drawing and in particular to FIGS. 1 to 3, the numeral 6 denotes generally a push-pull valve constructed in accordance with this invention. The valve includes a main body 8 within which are located relatively movable valve means having the capability of selectively connecting or isolating hot and cold water sources with water outlet means in a manner conventional in the art. The internal workings of the valve 6 thus comprise no part of the present invention and may be of the type disclosed in detail in the patents mentioned above.

As is conventional with such valves, an elongate stem 10, is operably connected to the movable valve means and protrudes from the main body 8. Stem 10 is reciprocally movable along its own axis between a retracted off position and an extended full volume flow position. Rotation of the stem 10 about its own axis varies the proportions of hot and cold water in the total flow through the valve and, for purposes of this description, it is assumed that counterclockwise rotation of stem 10 results in an increasingly greater proportion of hot water in the total water flow.

A projection or rib 12 is formed on the outer surface of main body 8 and extends substantially parallel to the longitudinal axis of stem 10. An outer shell 14 partially surrounds main body 8 and includes a channel 16 that registers with and receives rib 12. As readily may be seen from the drawing, outer shell 14 easily may be slipped over the outer surface of main body 8 during valve assembly.

Outer shell 14 has an upwardly facing contour that defines a slot 18 extending substantially parallel to the axis of stem 10. The sides of slot 18 are defined by surface 20 that extends to the extremity of main body 8 and surface 22 that terminates a distance from the extremity of main body 8 at an intersection with an upwardly facing, laterally extending surface 24. Surface 24 extends about the outer periphery of main body 8 to the side 26 of channel 16 remote from surface 20 (FIG. 3).

The manually operable valve operating handle has a one piece upper member identified generally by the numeral 28 which includes a sleeve 30 having an outwardly extending rim 32 formed at one end thereof that facilitates manual grasp of the handle. A disc portion 34 closes the end of sleeve 20 at its intersection with rim 32 and has an aperture 36 formed therethrough. The side of disc 34 proximate sleeve 30 is counterbored (not shown) in registry with aperture 36 to receive the free end of stem 10. This counterbore is formed with a flat that mates with flat surface 37 formed on stem 10 so that when the stem is received in the counterbore there can be no relative rotation between member 28 and the stem.

The internal surface of sleeve 30 is formed with a plurality of splines 38. Also located within sleeve 30 is an elongated post or cold water stop 40, the function of which will be described in detail below. Cold water stop 40 extends from the bottom surface of disc 34 and is spaced inwardly from the internal splines 38.

A lower handle member 42 of integral construction includes a sleeve portion 44 having external splines 46 formed thereon. A thickened rim 46 is formed at one extremity of splines 48 to strengthen member 42. On the inside surface 50 of sleeve 44 is formed a stop member or hot water stop 52.

The valve handle is assembled by inserting member 42 telescopically within sleeve 30 such that splines 38 and 48 mate. In this orientation, cold water stop 40 extends through the central aperture of sleeve 44 and is contiguous to inner sleeve wall 50. With handle members 28 and 42 so assembled, the composite handle is placed upon stem 10 that is received in the counterbore in disc 34 as described above. The parts are secured together by a screw 54 that passes through aperture 36 and engages the internal threads in a tapped hole 55 formed in the end of stem 10.

Due to the locating feature provided by flat 37 on stem 10, upper handle member 28 is oriented in assembly relative to stem 10 so that when stem 10 is in a rotational position corresponding to a cold water only valve position, cold water stop 40 registers with slot 18 (FIG. 3). In this cold water only position, stem 10 may be moved axially to a retracted, water flow shut off position since retracting movement of the stem results in stop 40 being received within slot 18. In this off position, stem 10 may not be rotated from the cold water only position because of abuttment between stem 40 and side walls 20 and 22 of slot 18.

If it is desired to open the valve 6 to permit water flow by lifting the valve handle and causing stem 10 to extend from main body 8, the valve thus must be opened with stem 10 in the cold water only rotational position. Once sufficient axial movement of stem 10 is accomplished so that the end of stop 40 clears slot side wall 22 (a condition whereat there will be relatively high volume cold water flow), stem 10 may be rotated counterclockwise from the cold water only position to gradually increase the proportion of hot water flowing through the valve and obtain higher output water temperatures. Although such counterclockwise rotation is permitted, clockwise rotation from the cold water only position is prohibited because slot side wall 22 is much shorter than slot side wall 20, the latter extending to the top of main body 8.

Counterclockwise rotation of stem 10 may be continued until the maximum water temperature position is reached. This position is reached when hot water stop 52 abuts side 26 of channel 16 as illustrated in FIG. 2. It thus may be appreciated that the magnitude of rotation between the lowest temperature valve setting whereat cold water stop 40 contacts side 20 of channel 16 and the highest temperature setting whereat hot water stop 52 contacts side 26 of channel 16, is determined by the arc distance between stops 40 and 52. The valve of this invention provides for adjustment of this distance to vary the upper limit of the percentage of hot water flow in the total volume of water passing through the valve. This adjustment allows compensation for varying temperatures of hot water that may be supplied from hot water sources.

Adjustment of the arc distance between stops 40 and 52 is accomplished by the removal of screw 54 and the separation of handle parts 28 and 42. Part 42 then may be rotated relative to part 28 to adjust the distance between the stops and reinserted therein and the composite, two piece handle reattached to stem 10 by the screw.

It may be seen from the foregoing that the contoured, one piece outer shell 14, that easily may be construed and fitted to valve main body 8, reliably performs a number of functions when utilized with the valve handle described above. Surfaces 20 and 22 act as stops to prevent rotational movement of stem 10 from the cold water position when the stem is in the retracted off position. Surface 20 also functions as a stop preventing clockwise rotation of stem 10 from the cold water only position. Surface 24 acts as a stop against the outermost surface of cold water stop 40 to prevent axial movement of stem 10 to the retracted off position unless the stem is in the cold water only rotational position. Surface 26 acts as a stop in cooperation with hot water stop 52 to limit counterclockwise rotation of stem and thus limit the percentage of hot water in the total water volume passing through the valve.

FIG. 4 illustrates a modified handle arrangement that may be used in the hot water valve of this invention. This handle includes an upper member 58 similar in construction to member 28 in that it includes a sleeve 60, rim 62, disc 64, central aperture 66 and cold water stop 68. However, the inside surface of sleeve 60 is smooth and disc 64 has an arcuate hole 70 formed therethrough.

Lower handle member 72 comprises a disc 74 having central aperture 76 formed therethrough. An arcuate hot water stop 78 extends from one surface of disc 74 proximate the outer periphery thereof. (The relatively large size of hot water stop 78 as compared with hot water stop 52 of FIG. 1 is to give stop 78 sufficient structural strength that is afforded stop 52 by structure contiguous the latter but not the former.) An arcuate, elongate hole 80 is formed through disc 74 and a portion of the disc is cut away along an arc of the circumference thereof at 82.

Assembly of the modified handle 56 is accomplished by inserting member 72 within sleeve 60 of member 58 so that cold water stop 68 is positioned in cut away portion 82. In this orientation, apertures 70 and 80 will register such that screw 84 can pass through these openings and engage a nut 86 to attach members 58 and 72 together and prevent relative rotation of these parts. A cap 88 optionally may be placed within the confines of rim 62 for decorative purposes. (Such a cap also may be used with the embodiment of FIG. 1.) The composite handle 56 then may be secured to stem 10 by placing the handle over the stem such that the stem extends through apertures 76 and 66 and may be engaged by a screw (not shown) corresponding to screw 56 of FIG. 1.

Cold water stop 68 and hot water stop 78 function in cooperation with the fixed stops that comprise surfaces of outer shell 14 exactly as do stops 40 and 52, respectively, of FIG. 1. Such function is described in detail above and will not be repeated. Modified handle 56 is advantageous in that adjustment of the arc distance between stops 68 and 78 to adjust the maximum hot water temperature available may be accomplished without removal of handle 56 from stem 10.

To accomplish such an adjustment, decorative cap 88 is removed and screw 84 partially loosened so that relative rotation between members 58 and 72 may be accomplished as desired. This relative rotation is possible because of the relatively long arc lenth of aperture 80. Retightening of the screw after such an adjustment makes the handle fully functional once again.

It thus may be seen that this invention provides a single handle faucet valve of the push-pull type that is incapable of being manipulated directly to an off condition to a condition wherein water at elevated temperature is supplied. The operating handle of the valve of this invention can be moved to a hot water position only by first passing through a relatively high volume cold water only position. Also, the faucet valve of this invention is adjustable to limit the possible percentage of water from the hot water source in the total water flow. All these functions are accomplished by cooperating parts having designs that are relatively simple and reliable in performance.

We claim:

1. A single handle hot and cold water mixing and flow control faucet valve of the type having a main body enclosing relatively movable valve means selectively operable to connect or isolate hot and cold water sources with water outlet means and an elongate manually movable operating stem operably connected to said valve means for movement therewith and projecting from said main body, said stem being reciprocally movable along its longitudinal axis between a retracted off position and an extended full volume position to vary the flow volume through said faucet valve and rotatable about its own axis between a cold water only position and a hot water only position to vary the proportions of hot and cold water passing through said faucet valve. the improvement comprising: first and second fixed stop means spaced apart on the outer periphery of said main body and extending substantially parallel to said axis, third fixed stop means adjacent said second fixed stop means on the outer periphery of said main body and extending at an angle from said second stop means, and first movable stop means secured to said stem for movement therewith, said third fixed stop means and said first movable stop means cooperating to prevent axial movement of said stem to the retracted off position unless said stem is in the cold water only rotational position, said first movable stop means in said retracted off position being received between said first and second fixed stop means and cooperating therewith to prevent rotation of said stem from the cold water only position while permitting axial movement of said stem towards the extended full volume position, said first movable stop and said first fixed stop means cooperating to prevent rotation of said stem in a first rotational direction from said cold water only position when said stem is in all axial positions.

2. The faucet valve of claim 1, including second movable stop means secured to said stem for movement therewith and spaced from said first movable stop means, said second movable stop means cooperating with said first fixed stop means to limit the extent of possible rotational movement of said stem in the other rotational direction.

3. The faucet valve of claim 2, wherein said first movable stop means is formed on a first member secured to said stem and said second movable stop means is formed on a second member secured to said stem.

4. The faucet valve of claim 3, wherein said first and second members are formed with cooperating interconnecting means adjustably positioning said members relative to one another to adjustably space said first and second movable stop means to vary the extent of possible stem rotation.

5. The faucet valve of claim 4, wherein said interconnecting means comprise splines formed on said members and one of said members is at least partially telescopically received in the other of said members.

6. The faucet valve of claim 3, further including fastening means adjustably securing said members together in any one of plural rotational orientations to adjustably space said first and second movable stop means to vary the extent of possible stem rotation.

* * * * *